(12) United States Patent
Bookbinder et al.

(10) Patent No.: US 10,422,973 B2
(45) Date of Patent: Sep. 24, 2019

(54) SAP COATING LAYER FOR CABLE COMPONENT AND RELATED SYSTEMS AND METHODS

(71) Applicant: CORNING OPTICAL COMMUNICATIONS LLC, Hickory, NC (US)

(72) Inventors: Dana Craig Bookbinder, Corning, NY (US); Waldemar Stöcklein, Coburg (DE)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 15/709,844

(22) Filed: Sep. 20, 2017

(65) Prior Publication Data

US 2018/0011277 A1    Jan. 11, 2018

Related U.S. Application Data

(63) Continuation of application No. PCT/US2016/020188, filed on Mar. 1, 2016.

(60) Provisional application No. 62/139,929, filed on Mar. 30, 2015.

(51) Int. Cl.
*G02B 6/44* (2006.01)

(52) U.S. Cl.
CPC .......... *G02B 6/4494* (2013.01); *G02B 6/443* (2013.01); *G02B 6/4435* (2013.01)

(58) Field of Classification Search
None
See application file for complete search history.

(56) References Cited

U.S. PATENT DOCUMENTS

| 5,163,115 A | 11/1992 | Sheu |
| 5,413,747 A | 5/1995 | Akers et al. |
| 5,607,550 A | 3/1997 | Akers |

(Continued)

FOREIGN PATENT DOCUMENTS

| EP | 1170614 A1 | 1/2002 |
| JP | 03137607 A | 6/1991 |
| WO | 199637900 A1 | 11/1996 |

OTHER PUBLICATIONS

European Patent Application No. 16773688.3 Office Action dated Oct. 29, 2018; 7 Pages; European Patent Office.

(Continued)

*Primary Examiner* — Tina M Wong
(74) *Attorney, Agent, or Firm* — William D. Doyle

(57) ABSTRACT

A process and system for making a water resistant cable component and water resistant cable components are provided. The water resistant cable includes a cable body including an inner surface defining a channel within the cable body and an elongate cable component located within the channel of the cable body. The cable also includes a contiguous layer of crosslinked super absorbent polymer surrounding the elongate cable component. The layer of crosslinked super absorbent polymer is formed by applying a liquid layer including a carrier material and an uncrosslinked super absorbent polymer pre-polymer material onto an outer surface of a component of the cable and then by crosslinking the super absorbent polymer pre-polymer while on the cable component to form a layer of crosslinked super absorbent polymer surrounding the cable component.

20 Claims, 5 Drawing Sheets

(56) References Cited

U.S. PATENT DOCUMENTS

| | | | |
|---|---|---|---|
| 6,103,317 A * | 8/2000 | Asai | G02B 6/4494 |
| | | | 106/14.05 |
| 6,304,701 B1 | 10/2001 | Bringuier et al. | |
| 6,565,981 B1 | 5/2003 | Messner et al. | |
| 7,026,373 B2 | 4/2006 | Smith et al. | |
| 8,406,589 B2 | 3/2013 | Amma | |
| 9,469,936 B2 * | 10/2016 | Yamaguchi | C09D 133/02 |
| 2002/0001443 A1 | 1/2002 | Bringuier | |
| 2002/0137837 A1 | 9/2002 | Flautt et al. | |
| 2003/0103741 A1 | 6/2003 | Heinl | |
| 2012/0155814 A1 | 6/2012 | Leonard et al. | |
| 2014/0086543 A1 | 3/2014 | Blazer et al. | |
| 2018/0011277 A1 * | 1/2018 | Bookbinder | G02B 6/443 |

OTHER PUBLICATIONS

International Search Report and Written Opinion of the International Searching Authority; PCT/US2016/020188; dated Jun. 30, 2016; 19 Pages; ISA/US Commissioner for Patents.

Invitation to Pay Additional Fees and, Where Applicable, Protest Fee; dated Apr. 15, 2016; PCT2016020188; 2 Pages.

English Translation of CN2016800256405 Search Report dated Mar. 28, 2019, China Patent Office, 7 pgs.

* cited by examiner

SAP COATING LAYER FOR CABLE COMPONENT AND RELATED SYSTEMS AND METHODS

PRIORITY APPLICATIONS

This application is a continuation of International Application No. PCT/US16/20188, filed on Mar. 1, 2016, which claims the benefit of priority to U.S. Application No. 62/139,929, filed on Mar. 30, 2015, both applications being incorporated herein by reference.

BACKGROUND

The disclosure relates generally to cables and more particularly to cables, such as optical communication cables, that include a crosslinked layer, film or coating of a super absorbent polymer material surrounding one or more cable components. Cables, including optical communication cables, have seen increased use in a wide variety of electronics and telecommunications fields. Optical communication cables contain or surround one or more optical fibers, and other non-optical cables typically including a conducting element (e.g., a copper wire) that acts as a transmission element. The cable provides structure and protection for the optical fibers wires within the cable.

SUMMARY

One embodiment of the disclosure relates to a method of manufacturing an optical fiber component. The method includes applying a liquid layer including a carrier material and an uncrosslinked super absorbent polymer pre-polymer material onto an outer surface of an optical fiber cable component. The method includes crosslinking the super absorbent polymer pre-polymer while on the optical fiber cable component to form a layer of crosslinked super absorbent polymer surrounding the optical fiber cable component. The method includes forming a polymer structure around the optical fiber component following formation of the layer of crosslinked super absorbent polymer.

An additional embodiment of the disclosure relates to an optical cable. The optical cable includes a cable body including an inner surface defining a channel within the cable body. The cable includes a plurality of tubes located in the channel of the cable body, wherein each of the plurality of tubes includes an outer surface, an inner surface and a channel defined by the inner surface of the tube. The cable includes a plurality of optical fibers located within the channel of each tube. Each optical fiber includes an optical core, cladding of a different refractive index than the optical core surrounding the core and a polymer coating layer surrounding the cladding. Each optical fiber also includes a contiguous layer of crosslinked super absorbent polymer surrounding the polymer coating layer. The contiguous layer of crosslinked super absorbent polymer is contiguous both circumferentially around the optical fiber and axially along the optical fiber for at least a length of 1 cm.

An additional embodiment of the disclosure relates to an optical fiber cable component. The optical fiber cable component includes an optical fiber having an optical core and a cladding layer of a different refractive index than the optical core surrounding the core. The optical fiber cable component includes an outer polymer layer located outside of and surrounding the optical fiber. The optical fiber cable component includes a contiguous layer of crosslinked super absorbent polymer surrounding the outer polymer layer. The contiguous layer of crosslinked super absorbent polymer is contiguous circumferentially around the optical fiber and contiguous axially along the optical fiber for at least a length of 1 cm.

An additional embodiment of the disclosure relates to a water resistant cable. The cable includes a cable body including an inner surface defining a channel within the cable body. The cable includes an elongate cable component located within the channel of the cable body. The cable includes a contiguous layer of crosslinked super absorbent polymer surrounding the elongate cable component. The contiguous layer of crosslinked super absorbent polymer is contiguous circumferentially around the elongate cable component and contiguous axially along the length of the elongate cable component for at least a length of 1 cm.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Figure 1:
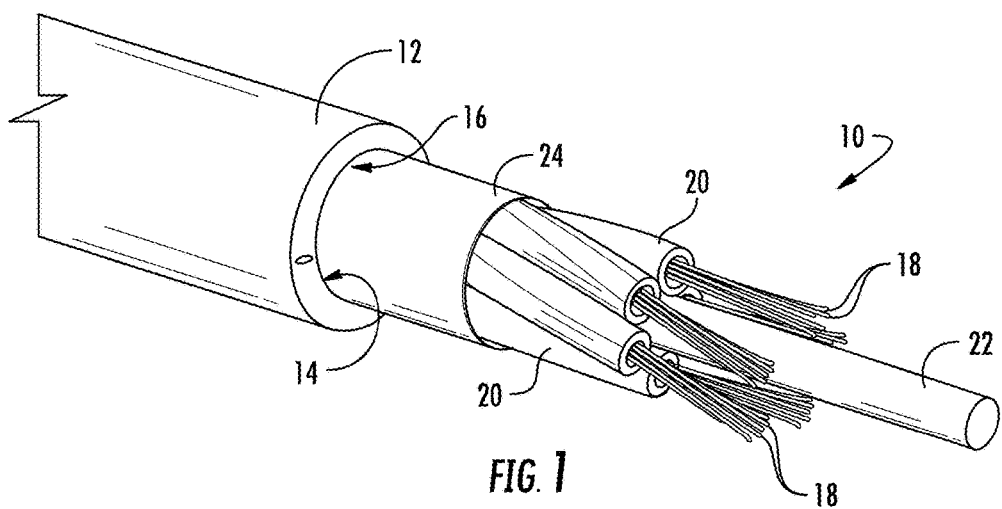
FIG. 1 is a perspective view of an optical fiber cable according to an exemplary embodiment.

Referring generally to the figures, various embodiments of a cable (e.g., a fiber optic cable, an optical fiber cable, a communication cable, an electrical conductor cable, etc.) are shown. In general, in the various cable embodiments disclosed herein, one or more cable component is coated or surrounded by a crosslinked super absorbent polymer (SAP) material. In various embodiments, the super absorbent polymer material forms a contiguous, continuous and relatively thin layer or film of super absorbent polymer material that surrounds one or more component of the cable. In various embodiments, the SAP coated cable components may be elongate cable components such as optical fibers, optical fiber buffer tubes, optical fiber ribbons, and/or electrical conductor wires.

In general, the systems, processes and related cable components relate to cable components that include the water blocking/absorbing functionality of the SAP material. However, in contrast to cable arrangements that utilize SAP powders or particles, the SAP coated components discussed herein may provide for even distribution of SAP along the length of the cable component, and this even distribution may result in a reduction or elimination of particle-based bend attenuation that may be experienced by optical fibers within a cable utilizing SAP particles for water blocking. In addition, because the SAP coating layer discussed herein surrounds the cable components, the SAP material of the presented disclosure tends to remain substantially fixed relative to the coated cable component even as the cable is wound, unwound and deployed in the installation environment.

In addition, in various embodiments, the SAP coating layer provides a relatively thin but consistent thickness of SAP material distributed along the length of the coated cable component. It is believed that the thin, evenly distributed SAP coating disclosed herein allows the cable component to hold enough SAP material to provide satisfactory water blocking capabilities while at the same time allowing for a the cable component to have a smaller overall cross-sectional area as compared to cables that use a particulate SAP water blocking material.

The present disclosure also relates to a system and method for forming an SAP coated cable component. In various embodiments, a cable component is provided, and an application device applies a liquid material including an uncrosslinked SAP pre-polymer material on the outer surface of the cable component. Following application, the SAP pre-polymer material is crosslinked or cured while on the outer surface of the cable component forming a relatively thin and continuous SAP layer or film around the cable component. In this manner the present disclosure provides a system and process for forming an SAP coated cable component in a continuous process suitable for integration with cable formation systems. For example, in various embodiments, the continuous SAP layer is formed around one or more optical fiber, and then following SAP layer formation, a buffer tube is extruded around the one or more SAP coated fibers. In other embodiments, the continuous SAP layer may be formed on the outer surface of a wide range of cable components including optical fiber buffer tubes, optical fiber ribbons, armor layers, strength members, electrical conductors, etc.

In various non-limiting embodiments the SAP comprises polyacrylate and polyacrylamide polymers and copolymers; polyacrylic acid; polyacrylic acid ammonium and/or alkali salts where the alkali comprises salts Li, Na or K; maleic anhydride (acid) copolymers and their ammonium and/or alkali salts where the alkali comprises salts Li, Na or K; carboxymethylcellulose and its ammonium and/or alkali salts where the alkali comprises salts Li, Na or K; polyvinyl alcohol polymers and copolymers and polyethylene oxide polymers and copolymers.

Referring to FIG. 1, a cable, shown as cable 10, is shown according to an exemplary embodiment. Cable 10 includes a cable body, shown as cable jacket 12, having an inner surface 14 that defines a channel, shown as central bore 16. In various embodiments, cable 10 may include one or more optical fiber cable component located within bore 16. In various embodiments, the optical fiber component may include a plurality of optical transmission elements, shown as optical fibers 18, located within bore 16. Optical fibers 18 can include a wide variety of optical fibers including multi-mode fibers, single mode fibers, bend insensitive fibers, multi-core optical fibers, etc. Generally, cable 10 provides structure and protection to optical fibers 18 during and after installation (e.g., protection during handling, protection from elements, protection from vermin, etc.).

In the embodiment shown in FIG. 1, cable 10 includes a plurality of different optical fiber cable components within central bore 16. As shown in FIG. 1, optical fiber cable elements include buffer tubes 20 and central strength member 22. Each buffer tube 20 surrounds and contains one or more optical fibers 18. Buffer tubes 20 are arranged around central strength member 22 that is formed from a material such as glass-reinforced plastic or metal (e.g., steel). In various embodiments, optical fibers 18, buffer tubes 20 and central strength member 22 are elongate cable components that extend the length of cable 10 between opposing ends of cable 10. In various embodiments, cable 10 can include a variety of optic fiber cable components including filler rods, helically wound binders, electrical conducting elements, etc.

In the embodiment shown, buffer tubes 20 are shown in a helical stranding pattern, such as an SZ stranding pattern, around central strength member 22. In some embodiments, one or more intermediate layer, shown as layer 24, surrounds buffer tubes 20. In some embodiments, layer 24 may be a thin-film, extruded sheath that holds buffer tubes 20 in position around strength member 22. In various embodiments, cable 10 may include a reinforcement sheet or layer, such as a corrugated armor layer, between layer 24 and jacket 12, and in such embodiments, the armor layer generally provides an additional layer of protection to optical fibers 18 within cable 10, and may provide resistance against damage (e.g., damage caused by contact or compression during installation, damage from the elements, damage from rodents, etc.). In some embodiments, designed for indoor applications, cable 10 may include a variety of fire resistant components, such as fire resistant materials embedded in jacket 12 and/or fire resistant intumescent particles located within channel 16.

Figure 2:
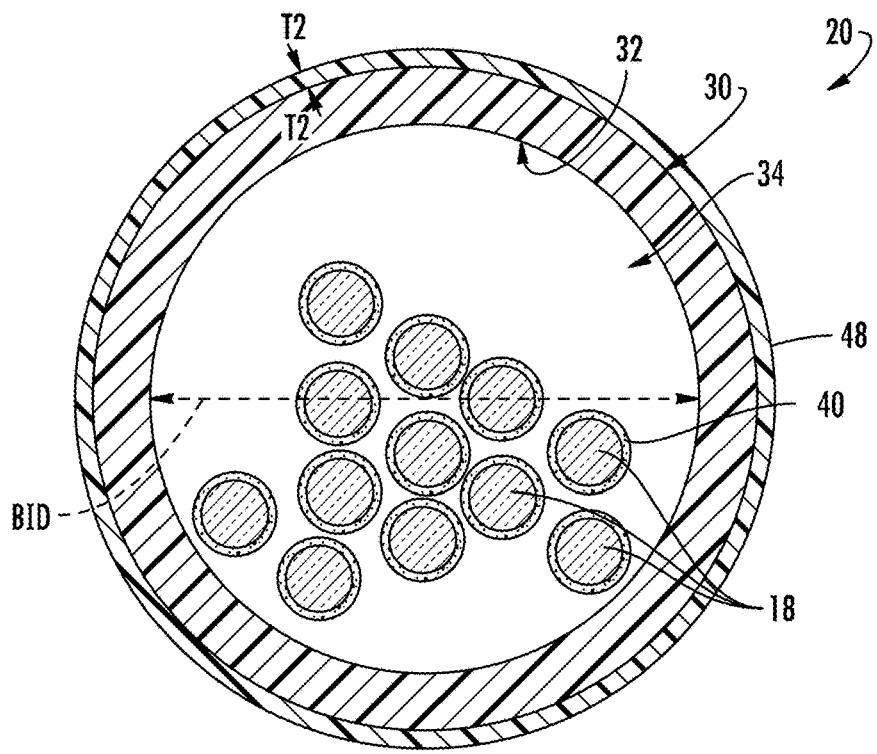
FIG. 2 is a cross-sectional view of the buffer tube of FIG. 1 according to an exemplary embodiment.

Referring to FIG. 2, a buffer tube 20 and optical fibers 18 are shown according to an exemplary embodiment. Buffer tube 20 includes an outer surface 30 that defines the exterior surface of the buffer tube and an inner surface 32 that defines a channel, shown as central bore 34. Optical fibers 18 are located within central bore 34. In various embodiments, optical fibers 18 may be loosely packed within buffer tube 20 (e.g., a "loose buffer"), and in such embodiments, cable 10 is a loose tube cable. In general, buffer tubes 20 are formed from a polymer material, such as polyethylene, polypropylene, etc., and as discussed in more detail below may be extruded around optical fibers 18.

As noted above, in various embodiments, one or more cable component may be coated or covered within a continuous crosslinked or layer of SAP polymer material. In various embodiments, any of the cable components of cable 10 may be coated with an SAP coating as discussed herein. In general, the SAP materials discussed herein are polymeric materials that swell and absorb water. In this manner the SAP coatings discussed herein limit water propagation within cable 10 by swelling and absorbing water. Thus, the SAP coating layers discussed herein are different from many other polymer layers and materials typically found in cable constructions (e.g., acrylate polymer layers surrounding optical fiber cores, ribbon bodies, buffer tubes, cable jackets, etc.). As will be noticed in FIG. 1, in various embodiments, cable 10 does not include separate SAP yarns or SAP tapes as a result of the inclusion of the SAP coating layers formed on other cable components. In this manner, in various embodiments, the SAP coating layers discussed herein may allow for the construction of more compact optical fiber cables with smaller cross-sectional areas because of the elimination of separate water blocking structures, such as water blocking tapes and yarns.

Figure 3:
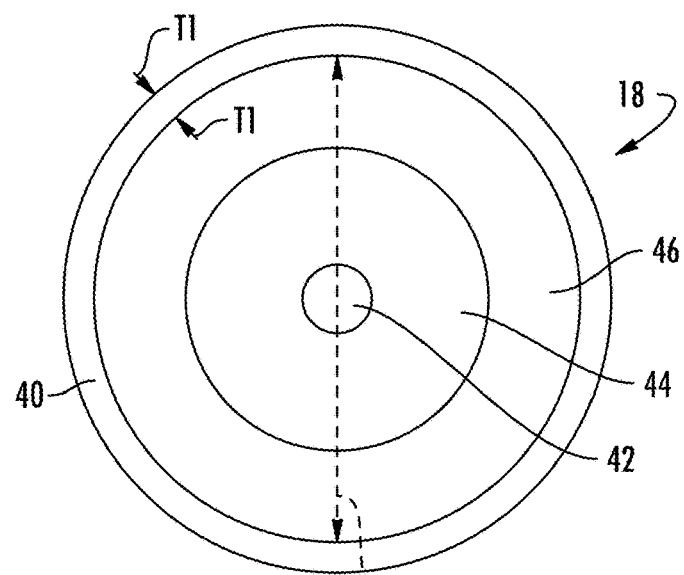
FIG. 3 is a cross-sectional view of an optical fiber of the cable of FIG. 1 according to an exemplary embodiment.

Referring to FIG. 2 and FIG. 3, in one embodiment, optical fibers 18 are coated or surrounded with a layer 40 of crosslinked SAP material. In various embodiments, SAP layer 40 is a continuous layer that surrounds optical fibers 18 in the circumferential direction and also extends in a continuous, contiguous and unbroken layer along a substantial length of optical fiber 18. In various embodiments, SAP layer 40 extends in a contiguous layer both circumferentially around and axially along optical fibers 18 to form an uninterrupted cylindrical film layer that extends least 1 cm in the axial direction of fiber 18 and more specifically for at least 10 cm in the axial direction of fiber 18. Thus, in contrast to prior cable arrangements that utilized SAP powders, layer 40 provides SAP material distributed continuously along at least portions of the length of fibers 18. In one embodiment, SAP layer 40 is in contact with the outermost surface of fiber 18 without being chemically bonded or adhered via an adhesive to the outer fiber surface. In such embodiments, SAP layer 40 is maintained around fiber 18 primarily by friction at the interface between the outer fiber surface and the inner surface of layer 40 and the inherent axial and circumferential structural integrity of the bonds between SAP molecules within layer 40. As used herein, the area, mass and volume of SAP refer to the super absorbent polymer itself and does not include the solvent (e.g., water).

Referring to FIG. 3, a detailed cross-sectional view of an SAP coated optical fiber 18 is shown according to an exemplary embodiment. In various embodiments, each optical fiber 18 has an optical core 42 surrounded by a cladding layer 44 that may be formed from one or more layers of cladding material. Cladding layer 44 has a different refractive index than optical core 42 and helps guide light down optical core 42 of the optical fibers by total internal reflection. In addition, each optical fiber 18 includes at least one polymer fiber coating layer 46 surrounding cladding layer 44. In various embodiments, fiber coating layer 46 may be a UV curable polymer material such as an acrylate or urethane acrylate material. In various embodiments, each optical fiber 18 has a fiber diameter, shown as FD. In various embodiments, FD of optical fiber 18 is between 75 micrometers and 350 micrometers, specifically between 100 micrometers and 300 micrometers. In various embodiments, FD is about 250 micrometers (e.g., 250 micrometers plus or minus 10 micrometer). In other various embodiments, FD is about 200 micrometers (e.g., 200 micrometers plus or minus 10 micrometer).

In the embodiment shown SAP layer 40 has a thickness shown as T1. In various embodiments, T1 graphically represents a maximum thickness of SAP layer 40 (also referred to herein as $T1_{max}$), and in some embodiments, T1 graphically represents an average thickness of SAP layer 40 along the length of the fiber (also referred to herein as $T1_{ave}$). In various embodiments, $T1_{max}$ and/or $T1_{ave}$ is less than the average diameter of the typical SAP particles used in optical cables. In various embodiments, $T1_{max}$ and/or $T1_{ave}$ is less than 200 micrometers. In various embodiments, $T1_{max}$ and/or $T1_{ave}$ is less than 60 micrometers and more specifically is less than or equal to 50 micrometers. In addition, because SAP layer 40 is substantially contiguous, in some embodiments layer 40 has a minimum thickness greater than or equal to 1 micrometer.

In some embodiments, in addition to having a relatively low maximum thickness, SAP layer 40 also has a relatively even or consistent thickness in the circumferential direction and/or in the axial direction, as compared to cables that use SAP particles for water blocking. For example, in some such embodiments, $T1_{ave}$ is greater than or equal to 1 micrometer and less than or equal to 200 micrometers. In other embodiments, $T1_{ave}$ is greater than or equal to 1 micrometer and less than or equal to 50 micrometers (i.e., 1 micrometers≤$T1_{ave}$≤50 micrometers). In another exemplary embodiment, $T1_{ave}$ is greater than or equal to 1 micrometer and less than or equal to 30 micrometers (i.e., 1 micrometers≤$T1_{ave}$≤30 micrometers). In various embodiments, the average thickness of layer 40 is relatively small as compared to the size of optical fiber 18. In various embodiments, the average thickness of SAP layer 40, $T1_{ave}$, is between 0.2% and 30% of FD, and in other embodiments, $T1_{ave}$ is between 1% and 20% of FD.

Referring back to FIG. 2, in various embodiments, inner surface 32 of buffer tube 20 defines a buffer tube inner diameter, shown as BID. In various embodiments, because of the relatively thin and even distribution of SAP layer 40 along fibers 18, both BID and total outer buffer tube diameter may be less than the corresponding dimensions of a buffer tube in which particulate SAP material is located within buffer tube channel 34 along with optical fibers 18. In various embodiments, BID is between 0.7 millimeters and 3 millimeters.

In various embodiments in which buffer tube 20 contains optical fiber ribbons instead of or in addition optical fibers 18, BID is between 1 millimeters and 7 millimeters. Each tube surrounding the optical fibers or optical fiber ribbons the has an inner diameter, BID, thus having an inner cross-sectional area, $BID1_{XC}$, and the total cross-sectional area of the crosslinked super absorbent polymer inside the tube (that is all of the SAP coated on all of the fibers or fiber components inside the tube) is $a1_{total}$. In various embodiments, the cross-sectional area percent of the SAP inside the tube relative to the tube inner diameter cross-sectional area is 0.01%≤100% ($a1_{total}$/$BID1_{XC}$)≤10% and, in various other embodiments, is 0.2%≤100% ($a1_{total}$/$BID1_{XC}$)≤10%. It should be noted that $a1_{total}$ is the cross-sectional total area of the crosslinked super absorbent polymer inside the buffer tube prior to the swelling that occurs in the presence of water.

In some buffer tube designs that utilize SAP particles within the buffer tube, optical attenuation of optical fibers can occur because of microbending experienced by the optical fiber at the point of contact between the optical fiber and the relatively large and discreet SAP particles. However it is believed that, in various embodiments discussed herein, the even distribution of SAP provided by layer 40 decreases/eliminates the microbending common with SAP particle water blocking arrangements, and correspondingly, decreases or reduces the optical attenuation associated with microbending in the presence of SAP particles. Further, in various embodiments, the SAP layer 40 on the outer surface of fiber 18 acts to limit sticking, friction or adhesion between the SAP coated optical fiber and adjacent cable components. In such embodiments, the SAP layer 40 results in the coated optical fiber having a lower pull-out force (i.e., the force required to withdraw one of the optical fibers out of its buffer tube) as compared to a buffer tube filled with optical fibers without SAP layer 40.

As shown in FIG. 3, SAP layer 40 surrounds and is coupled to the outer surface of fiber coating layer 46. In this arrangement, an inner surface of SAP layer 40 is in contact with and adhered to the outer surface of fiber coating layer 46 with sufficient bonding strength that SAP layer 40 stays in place relative to fiber 18 during various processing, assembly and storage steps that fiber 18 experiences. Further, SAP layer 40 includes sufficient SAP material to provide for satisfactory water blocking performance. In various embodiments, SAP layer 40 comprises a mass, m1, of the crosslinked super absorbent polymer in milligrams per meter length of the optical fiber cable component that is $1 \le m1 \le 200$. In various other embodiments, the mass, m1, of the crosslinked super absorbent polymer in milligrams per meter length of the optical fiber cable component is $1 \le m1 \le 60$. In one embodiment, the mass, m1, of the SAP refers to the mass of SAP on each fiber (or other optical cable component) inside the buffer tube, and, in various embodiments, there can be more than one fiber inside the buffer tube (e.g., 2 to 24 fibers) including a ribbon which can have 2 to 24 fibers. It should be understood that the mass, m1, is the mass of the crosslinked superabsorbent polymer itself and does not include the mass of either the solvent or of absorbed water that may be present in a particular sample.

In various embodiments, optical fiber 18 may include a colored outer portion. For example, outer polymer layer 46 may be formed from a colored material or may include colored indicia along its outer surface. In such embodiments, layer 40 is formed from a transparent or translucent SAP material such that the colored portion of optical fiber 18 is visible through layer 40. In various embodiments, layer 40 has a transmittance through the contiguous layer of crosslinked super absorbent polymer at least one wavelength between 400-700 nm that is between 0.2 and 1.

Referring back to FIG. 2, in one embodiment, buffer tube 20 is also coated or surrounded with a layer 48 of crosslinked SAP material. While FIG. 2 shows both optical fibers 18 and buffer tube 20 including SAP layers, in some embodiments, optical fibers 18 include SAP layer 40 and buffer tube 20 does not, and in another embodiment, buffer tube 20 includes SAP layer 48 and optical fibers 18 do not. In various embodiments, layer 48 is substantially the same as layer 40 discussed above except that layer 48 is in contact with and adhered to outer surface 30 of buffer tube 20. In accordance with yet other aspects of the present disclosure, not all fibers 18 and/or buffer tubes 20 have to be coated to provide the water blocking properties desired. For example, in a buffer tube 20 housing twelve optical fibers 18, water blocking may be provided by coating as few as two or three of the fibers 18.

Figure 4:
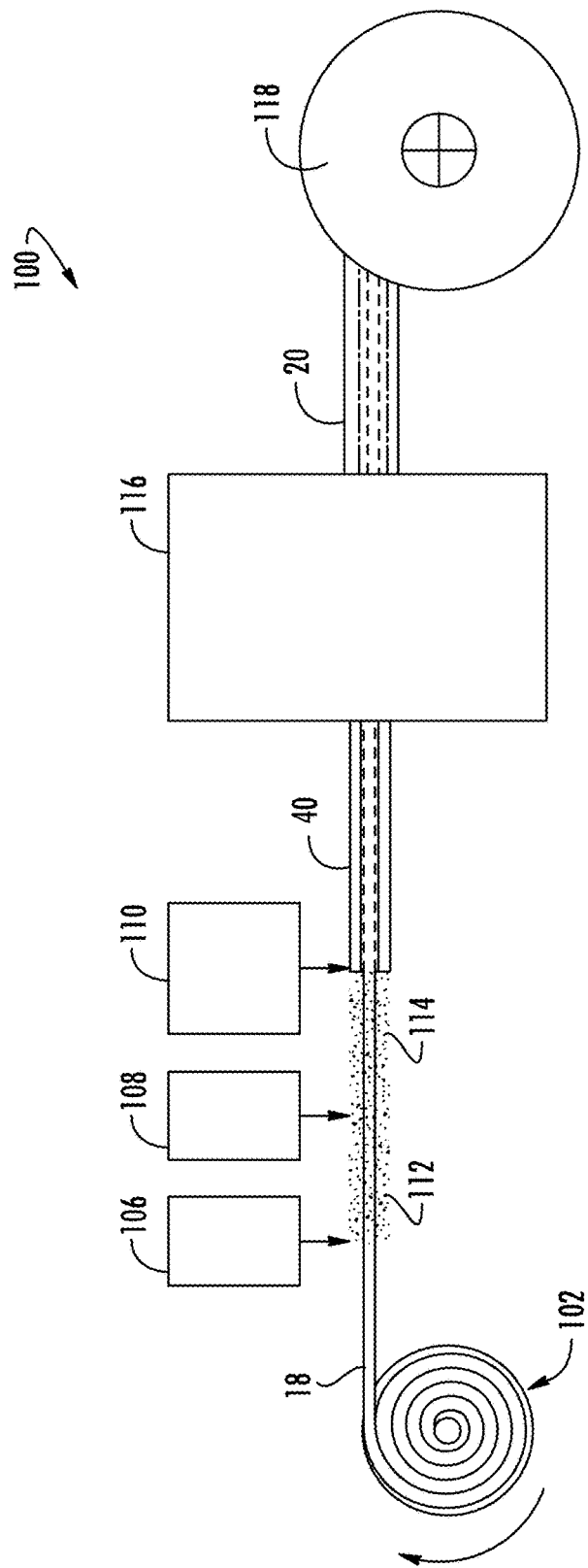
FIG. 4 is a schematic view showing a system and process for forming an SAP coated cable component according to an exemplary embodiment.

In FIG. 4 a system and process for preparing an SAP coated cable component is shown according to an exemplary embodiment. In particular, FIG. 4 shows a system 100 configured for forming an SAP coating on one or more optical fiber (such as optical fiber 18 discussed above) and then forming a buffer tube around the coated fiber. A cable component, shown in FIG. 4 as an optical fiber 18 is provided into system 100 from a supply or storage area, shown as a spool 102. Following unwinding of optical fiber 18 from spool 102, optical fiber 18 is passed into SAP coating system 104.

In the embodiment shown, SAP coating system 104 includes applicator 106, a heater 108 and curing station 110. In general, applicator 106 is configured to deposit a liquid material 112 that includes uncrosslinked SAP pre-polymer material onto the outer surface of fiber 18 as fiber 18 moves through applicator 106. The liquid material 112 includes a carrier material or solvent in which the SAP pre-polymer material is suspended or dissolved. In a specific exemplary embodiment, liquid material 112 is an aqueous solution of SAP pre-polymer material and the carrier material is water. In various embodiments, applicator 106 may be a variety of application systems suitable for application of the SAP pre-polymer liquid, including roll coaters, spray coaters, bath coaters, dip coaters, printing systems, ink-jet printing systems, sponge applicators, etc., such that liquid material 112 coats the entire circumference of fiber 18. In various embodiments, applicator 106 can apply a continuous layer of liquid 112 to form a substantial continuous SAP layer axially along fiber 18. In another embodiment, applicator 106 can apply intermittent bands of liquid 112 to form bands of SAP material interrupted by uncoated sections of fiber.

In an exemplary embodiment, after liquid SAP material 112 has been applied to fiber 18, coated fiber 18 passes through heater 108. Heater 108 causes the carrier material (e.g., water) of liquid material 112 to evaporate leaving a coating of dried SAP pre-polymer material 114 surrounding fiber 18. Because liquid material 112 coated the entire circumference of fiber 18, dried SAP pre-polymer material 114 also coats and surrounds the entire outer surface of fiber 18.

Following drying, fiber 18 coated with dried SAP pre-polymer material 114 passes through curing station 110. In general, curing station 110 causes the SAP pre-polymer to crosslink with each other to form an SAP material layer, such as SAP layer 40 discussed above, surrounding fiber 18. Curing station 110 may be any curing system suitable for causing crosslinking of the SAP pre-polymer material present on fiber 18. In various embodiments, curing station 110 may generate UV radiation or heat to crosslink the SAP pre-polymer material.

In general, following formation of the SAP layer on the cable component, an exterior polymer layer or polymer tube is formed around the SAP coated cable component. In the embodiment of FIG. 4, following formation of layer 40, SAP coated fiber 18 passes through an extrusion device, shown as buffer tube extruder 116. Buffer tube extruder 116 extrudes a fiber optic buffer tube, such as buffer tube 20, around optical fiber 18. Following buffer tube extrusion, the formed buffer tube 20 surrounding one or more SAP coated optical fibers 18 is stored in storage device, such as take-up spool 118. It should be understood that, for clarity and explanation, FIG. 4 shows a single optical fiber 18 coated with SAP material and surrounded by buffer tube 20. However, in various embodiments, system 100 may be scaled such that multiple optical fibers (e.g., 2, 4, 6, 12, 24, etc.) are coated with SAP material via SAP coating system 104, and that the multiple coated fibers are passed through buffer tube extruder 116 such that multiple SAP coated optical fibers are located within a single buffer tube 20.

Further, as shown in FIG. 4, system 100 and SAP coating system 104 in particular provides a continuous system in which optical fibers are coated with SAP materials in line with buffer tube extrusion, and then the buffer tube is stored prior to cable formation. Thus, such a system provides a flexible manufacturing system that allows for manufacture of buffer tubes and cables not limited by the length of SAP tapes and SAP yarns common in many cable manufacturing systems. In addition, the in-line and continuous process of system 100 may allow for the use of less overall SAP material within a buffer tube or cable due to the higher level of control provided by coating system 104 as compared to the typical SAP yarns and tapes. In another embodiment, cable jacket formation is performed in line with SAP layer formation and buffer tube extrusion. In another embodiment, optical fibers may be precoated with SAP layer 40 and stored prior to processing for buffer tube formation.

It should be understood that while FIG. 4 describes a system that coats optical fibers prior to and continuous with buffer tube extrusion, SAP coating system 104 can be used to apply SAP coating to essentially any other cable component, including optical fiber cable components, such as buffer tubes, strength members, armor layers, etc., as well as metal conductor wires in non-optical cables. An embodiment of one such system is shown in FIG. 5.

Figure 5:
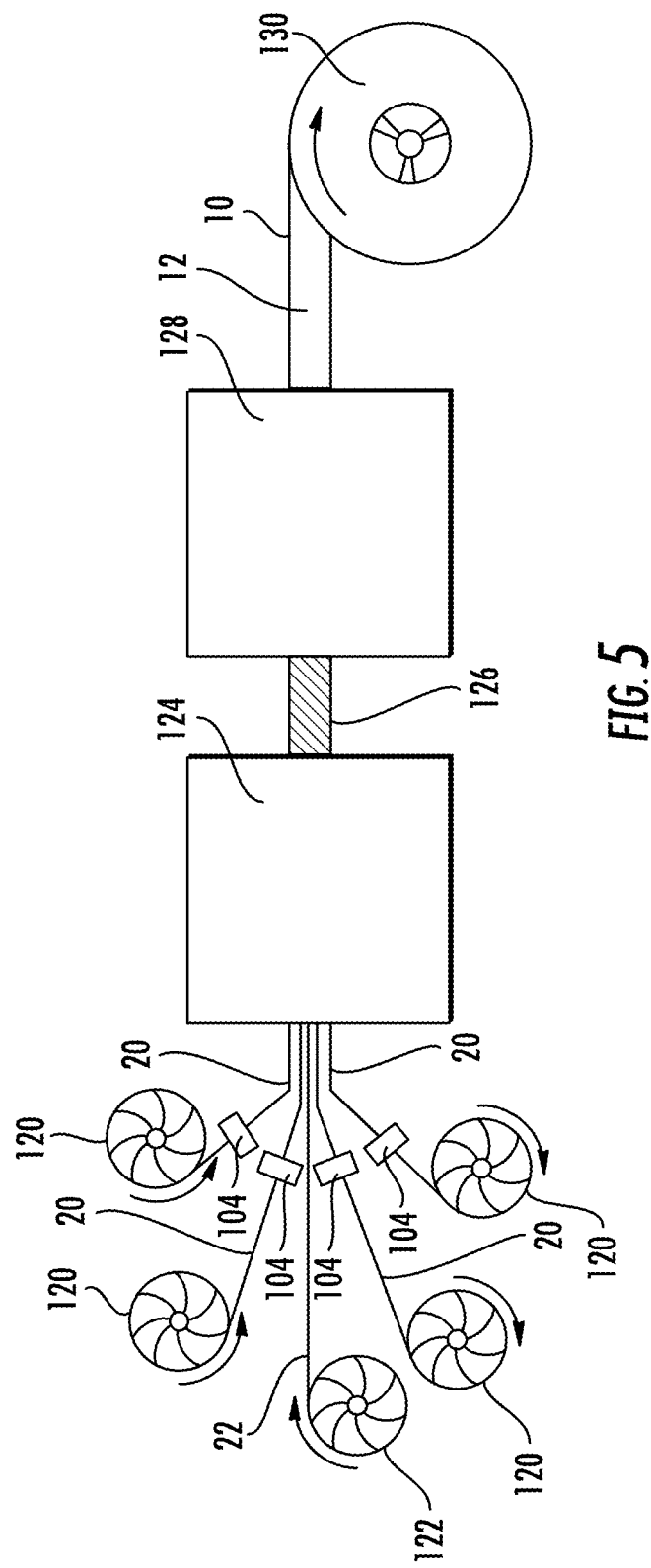
FIG. 5 is a schematic view showing a system and process for forming an SAP coated cable component according to another exemplary embodiment.

Specifically, FIG. 5 is a schematic view of a process and a system that applies an SAP layer onto a buffer tube prior to cable jacket extrusion. As will be understood, after formation of buffer tubes 20 around fibers 18, buffer tubes 20 may be stored on reels 120. In various embodiments, buffer tubes 20 are extruded around fibers 18, and then are cooled prior to winding onto reels 120. Once cooled, buffer tubes 20 are wound onto reels 120 and may be stored prior to cable formation. In addition, one or more filler tube or rod may be stored on a reel similar to reels 120, and a central strength member 22 may be stored on reel 122.

To produce a cable, such as cable 10, buffer tubes 20 are unwound from reels 120 and are advanced through SAP coating systems 104. SAP coating systems 104 form an SAP coating layer, such as layer 48, around each buffer tube 20, in the same manner discussed above regarding FIG. 4.

Following formation of the SAP layer, SAP coated buffer tubes 20 move into stranding station 124. Stranding station 124 couples buffer tubes 20 together along with any filler tubes and central strength element 22. In one embodiment, buffer tubes 20 and any filler tubes are coupled around strength element 22 in a pattern 126, such as a helical pattern or in a reversing helical pattern, such as an SZ stranding pattern. Similar to the system described in FIG. 4, after buffer tubes 20 are coated with SAP by SAP coating systems 104, a polymer tube, e.g., a cable jacket, is formed around the SAP coated buffer tubes. In the embodiment shown in FIG. 5, following stranding, the components of cable 10 are passed into one or more additional stations 128 to extrude a jacket 12 around coated buffer tubes 20 and any other interior cable components. Following jacket extrusion, cable 10 may then be stored on a reel 130.

Figure 6:
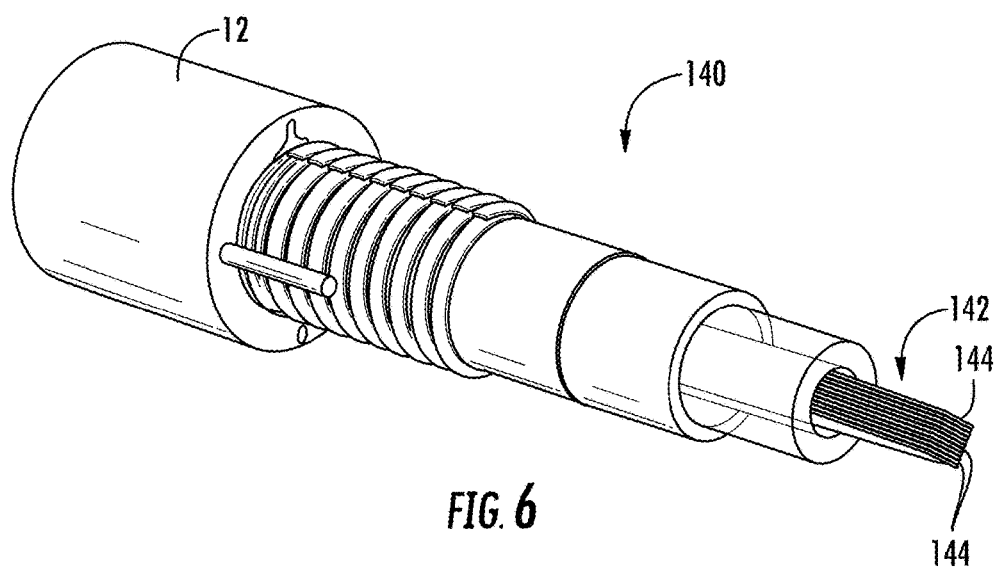
FIG. 6 is a perspective view of an optical fiber cable according to another exemplary embodiment.

Referring to FIG. 6, a cable 140 is shown according to an exemplary embodiment. Cable 140 includes a stack 142 of a plurality of optical fiber components, shown as fiber optic ribbons 144, located within a buffer tube that is located within the channel of cable body 12. As will be generally understood, optical fiber ribbons 144 typically include a plurality of optical fibers arranged in an array (e.g., a linear array) that is surrounded by a polymer ribbon body. In various embodiments, each fiber optic ribbon 144 includes an SAP coating layer, similar to layers 40 and 48 discussed above, that coats the outer surface of the polymer body of each ribbon 144.

Various embodiments of this disclosure also relate to methods or processes for forming SAP coated cable components as discussed herein. In specific embodiments, the coating methods include a method of manufacturing an optical fiber component. In such embodiments, the method includes applying a liquid layer including a carrier material and an uncrosslinked super absorbent polymer pre-polymer material onto an outer surface of an optical fiber cable component. The method includes crosslinking the super absorbent polymer pre-polymer while on the optical fiber cable component to form a layer of crosslinked super absorbent polymer surrounding the optical fiber cable component, and the method includes forming a polymer structure around the optical fiber component following formation of the layer of crosslinked super absorbent polymer around the optical fiber cable component. In various embodiments, such methods form SAP coated cable components such as optical fibers 18, buffer tubes 20, and ribbons 144 as discussed herein. In addition, in various embodiments, such methods may be performed utilizing SAP coating systems discussed herein, such as coating system 104.

In various embodiments, the buffer tubes discussed herein may be formed from a variety of extruded polymer materials including polypropylene, polyethylene, polycarbonate material, polybutylene terephthalate (PBT), polyamide (PA), polyoxymethylene (POM), poly(ethene-co-tetrafluoroethene) (ETFE), or combinations of any of the polymer materials discussed herein, etc. In various embodiments, cable jacket 12 may be a made from a wide variety of materials used in cable manufacturing such as medium density polyethylene, polyvinyl chloride (PVC), polyvinylidene difluoride (PVDF), nylon, polyester or polycarbonate and their copolymers. In addition, the material of cable jacket 12 may include small quantities of other materials or fillers that provide different properties to the material of cable jacket 12. For example, the material of cable jacket 12 may include materials that provide for coloring, UV/light blocking (e.g., carbon black), burn resistance, etc.

The optical fibers discussed herein may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber.

While the specific cable embodiments discussed herein and shown in the figures relate primarily to cables and core elements that have a substantially circular cross-sectional shape defining substantially cylindrical internal lumens, in other embodiments, the cables and core elements discussed herein may have any number of cross-section shapes. For example, in various embodiments, the cable jacket and/or buffer tubes may have a square, rectangular, triangular or other polygonal cross-sectional shape. In such embodiments, the passage or lumen of the cable or buffer tube may be the same shape or different shape than the shape of the cable jacket and/or buffer tubes. In some embodiments, the cable jacket and/or buffer tubes may define more than one channel or passage. In such embodiments, the multiple channels may be of the same size and shape as each other or may each have different sizes or shapes.

In accordance with yet other embodiments of the present disclosure, the SAP coating system and methods described herein may be used in micromodule cables. Micromodule cables are cables comprising one or more micromodule subunits, each micromodule subunit comprising an extremely flexible tube surrounding one or more optical fibers, typically twelve optical fibers. The extreme flexibility of the tube of a micromodule subunit may derive from using a sheath material comprising inorganic fillers such as, for example, ethylene vinyl acetate (EVA) copolymers or linear low density polyethylene (LLDPE). An inner diameter of the flexible tube of the micromodule subunit may be so small that during extrusion the fibers are partly surrounded by the sheath material. The fibers and/or the flexible tubes of the micromodule subunits may comprise an SAP coating in accordance with aspects of the present disclosure, resulting in a dry, water-blocked micromodule.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A method of manufacturing an optical fiber component comprising:
    applying a liquid layer including a carrier material and an uncrosslinked super absorbent polymer pre-polymer material onto an outer surface of an optical fiber cable component;
    crosslinking the super absorbent polymer pre-polymer while on the optical fiber cable component to form a layer of crosslinked super absorbent polymer surrounding the optical fiber cable component; and
    forming a polymer structure around the optical fiber component following formation of the layer of crosslinked super absorbent polymer, wherein the layer of crosslinked super absorbent polymer is contiguous circumferentially around the optical fiber cable component and has a mass, m1, in milligrams per meter length of the optical fiber cable component of $1 \leq m1 \leq 200$.

2. The method of claim 1 wherein the layer of crosslinked super absorbent polymer is contiguous axially along the optical fiber cable component for at least a length of 1 cm.

3. The method of claim 2 wherein the maximum thickness of the contiguous layer of crosslinked super absorbent polymer is less than 200 micrometers.

4. The method of claim 2 wherein the maximum thickness of the contiguous layer of crosslinked super absorbent polymer is less than 60 micrometers.

5. The method of claim 2 wherein the average thickness, $T1_{ave}$, in micrometers of the contiguous layer of crosslinked super absorbent polymer is $1 \leq T1_{ave} \leq 200$.

6. The method of claim 2 wherein the average thickness, $T1_{ave}$, in micrometers of the contiguous layer of crosslinked super absorbent polymer is $1 \leq T1_{ave} \leq 50$.

7. The method of claim 2 wherein the mass, m1, of the crosslinked super absorbent polymer on the optical fiber cable component in milligrams per meter length of the optical fiber cable component is $1 \leq m1 \leq 60$.

8. The method of claim 1 wherein the polymer structure around the optical fiber component has an inner diameter, BID, and a cross-sectional area, $BID1_{xc}$, wherein the total cross-sectional area of the crosslinked super absorbent polymer on the optical fiber cable component is $a1_{total}$, and wherein $0.2\% \leq 100\% \, (a1_{total}/BID1_{XC}) \leq 10\%$.

9. The method of claim 1 wherein the optical fiber cable component is an optical fiber including an optical fiber core, a cladding layer and an outer polymer layer surrounding the optical fiber core and the cladding layer, wherein the layer of crosslinked super absorbent polymer has an inner surface contacting the outer polymer layer.

10. The method of claim 9 wherein the polymer structure is a polymer buffer tube extruded around the optical fiber.

11. The method of claim 10 further comprising winding the buffer tube including the optical fiber around a spool following formation of the layer of crosslinked super absorbent polymer.

12. The method of claim 1 wherein the optical fiber cable component is an optical fiber buffer tube surrounding at least one optical fiber, wherein the layer of crosslinked super absorbent polymer has an inner surface contacting an outer surface of the optical fiber buffer tube, wherein the polymer structure is a cable jacket extruded around the optical fiber buffer tube.

13. The method of claim 1 wherein the carrier material is water and the super absorbent polymer pre-polymer is dissolved in the water, wherein the method further comprises heating the applied liquid layer to evaporate water prior to crosslinking the super absorbent polymer pre-polymer.

14. The method of claim 1, wherein crosslinking the super absorbent polymer pre-polymer occurs by heating.

15. The method of claim 3, wherein the optical fiber has a fiber diameter, FD, wherein an average thickness, $T1_{ave}$, of the contiguous layer of crosslinked super absorbent polymer is between 0.2% and 30% of FD.

16. The method of claim 3, wherein the optical fiber has a fiber diameter, FD, that is between 75 micrometers and 350 micrometers.

17. The method of claim 16, wherein the polymer coating of the optical fiber includes a colored section, wherein the contiguous layer of crosslinked super absorbent polymer is translucent such that the colored section is visible through the contiguous layer of crosslinked super absorbent polymer.

18. The method of claim 17, wherein the contiguous layer of crosslinked super absorbent polymer has a transmittance for at least one wavelength between 400-700 nm that is between 0.2 and 1.

19. The method of claim 18, wherein the crosslinked super absorbent polymer is transparent.

20. The method of claim 18, wherein the crosslinked super absorbent polymer is translucent.

* * * * *